Sept. 12, 1933.   J. F. LEAHY   1,926,646
GEAR CUTTER
Filed March 28, 1932   3 Sheets-Sheet 1
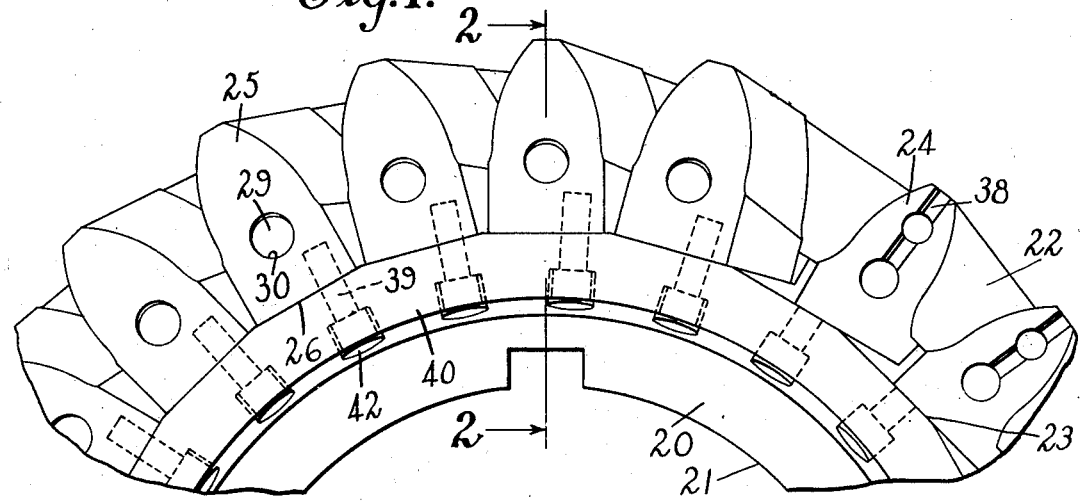
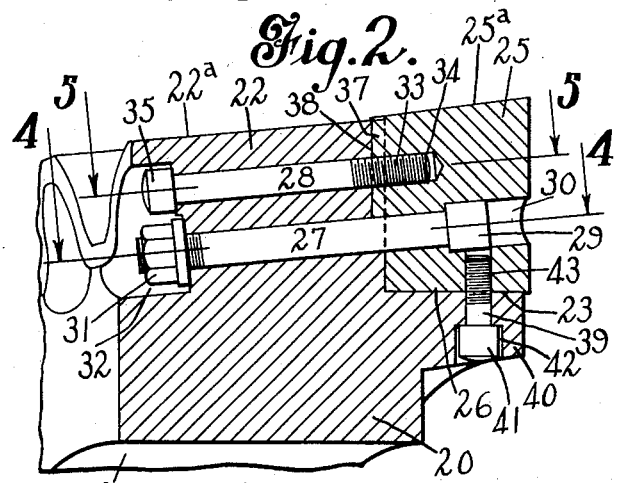
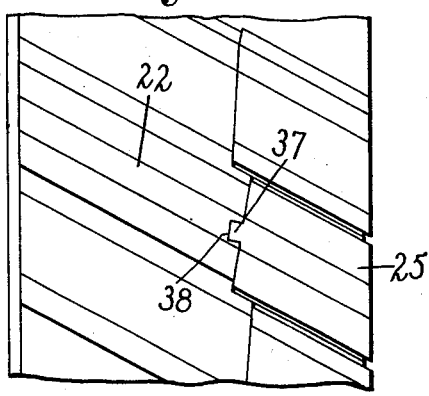
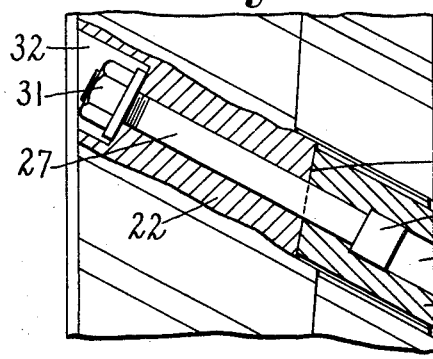
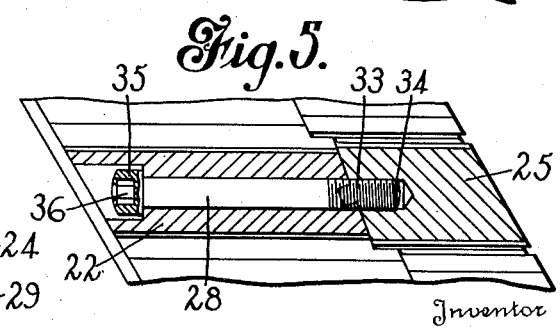
Inventor
James F. Leahy
By Burleser Bartholow
Attorneys

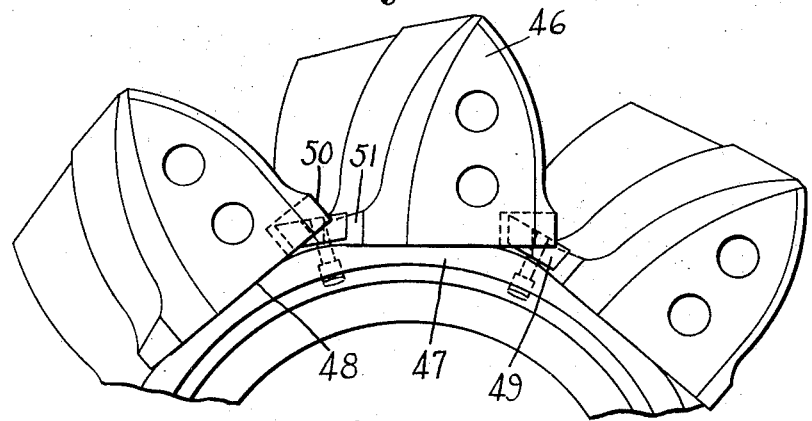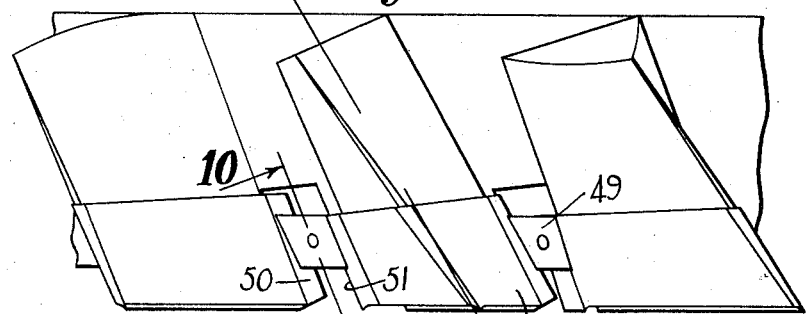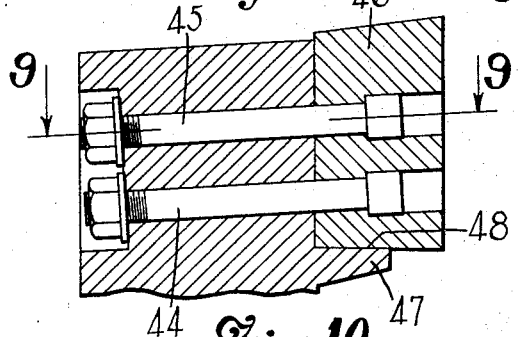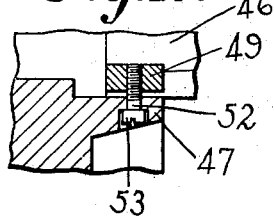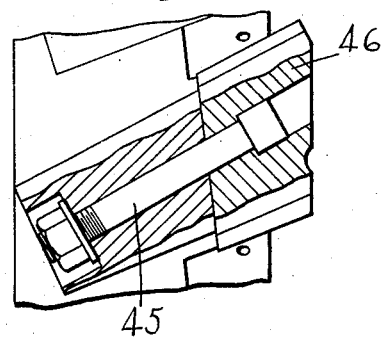

Sept. 12, 1933.                J. F. LEAHY                1,926,646
                               GEAR CUTTER
                         Filed March 28, 1932        3 Sheets-Sheet 3
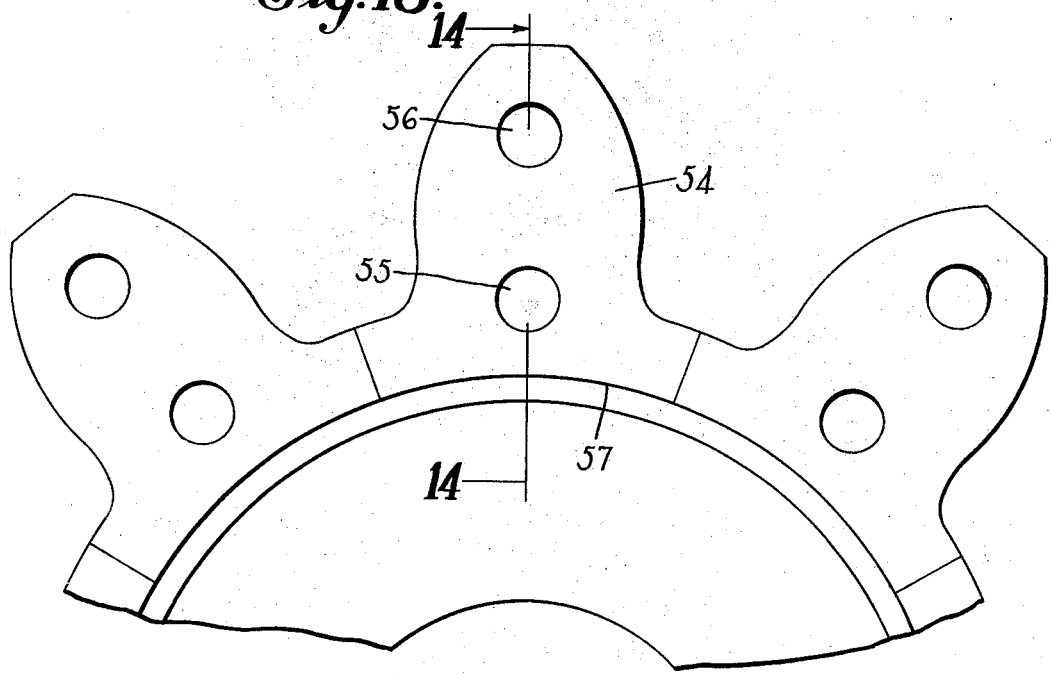
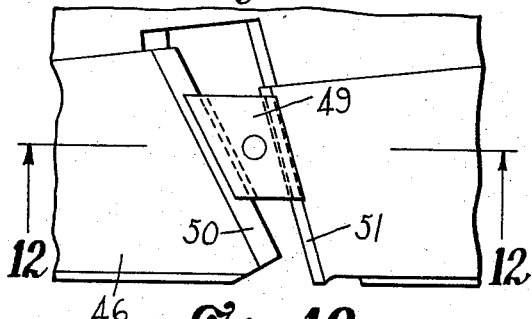
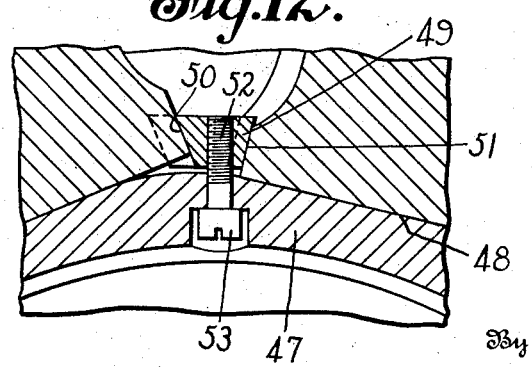
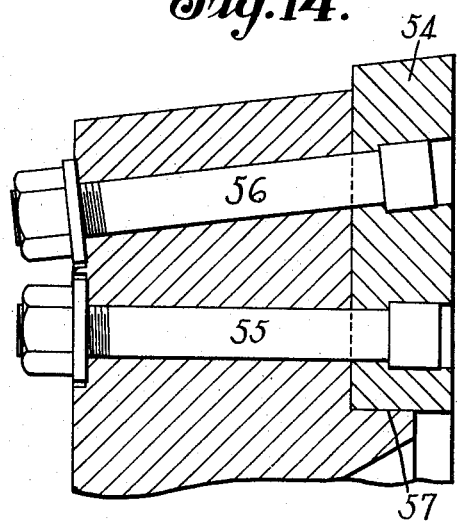
Inventor
James F. Leahy
By
Attorney Patented Sept. 12, 1933

1,926,646

UNITED STATES PATENT OFFICE 1,926,646

GEAR CUTTER

James F. Leahy, Kenmore, N. Y., assignor to Farrel-Birmingham Company, Inc., Buffalo, N. Y.

Application March 28, 1932. Serial No. 601,529

9 Claims. (Cl. 29—105)

This invention relates to gear cutting tools of the pinion type for generating gears by planing action and it has particular reference to a composite cutter in which the cutting is done by separate removable blades or bits detachably secured to the cutter body at the faces of the tooth-like projections on said body.

One of the objects of the invention is to provide improved means for securing the cutter blades to the body.

Another object is to furnish means for fastening the cutter blades very rigidly in the required positions so that the gear being generated will be cut very accurately, while, nevertheless, the construction is such that if one or more of the blades require sharpening or become so worn that new blades are needed the necessary removal and replacement of parts can be effected readily and with a minimum loss of time.

To these and other ends the invention consists in the novel features and combinations of parts to be hereinafter described and claimed.

In the accompanying drawings:

Fig. 1 is a partial front end view of a pinion type gear cutter embodying my improvements;

Fig. 2 is a section on line 2—2 of Fig. 1;

Fig. 3 is a partial plan view of the cutter shown in Fig. 1;

Figs. 4 and 5 are sections on lines 4—4 and 5—5, respectively, of Fig. 2;

Fig. 6 is a partial side view of another cutter of somewhat modified form;

Fig. 7 is a fragmentary plan view of the cutter shown in Fig. 6;

Fig. 8 is a section on line 8—8 of Fig. 7;

Fig. 9 is a section on line 9—9 of Fig. 8;

Fig. 10 is a section on line 10—10 of Fig. 7;

Fig. 11 is an enlarged fragmentary view of certain parts shown in Fig. 7;

Fig. 12 is a section on line 12—12 of Fig. 11;

Fig. 13 is a fragmentary side elevation of a further form of cutter embodying my improvements, this cutter being adapted to form straight-toothed or spur gears; and Fig. 14 is a section on line 14—14 of Fig. 13.

The cutter shown in Figs. 1 to 5, inclusive, is a cutter of the pinion type adapted to cut helical gears by planing action. Such a cutter is particularly intended for use in Sykes gear cutting machines, and in such a machine the cutter and blank are slowly rotated to generate the gear and the cutter is given a twisting action so as to form the teeth on the blank at the desired angle to the axis. The cutting tool has a ring-like body 20 provided with a central spindle opening 21 and teeth 22 formed upon its periphery. The teeth 22 are cast or otherwise formed integrally with the body portion 20 and are slightly reduced in dimensions such as width and height, from those dimensions which would be required if these teeth were to act as cutting means. The body portion 20 and the teeth 22 are preferably made from a steel casting or forging which is sufficiently tough and rugged for the purpose, although easily worked into suitable form by appropriate tools. One end face of each tooth 22 is cut back to form an outwardly directed series of shoulders 23, one of which is disposed at the base of each tooth, and by cutting away the ends of the teeth a series of forwardly directed end faces 24 are formed on the teeth. A cutting blade or plate 25 is disposed against each of the end faces 24, with its base 26 resting upon the shoulder 23. The teeth 22 are directed at the required helical angle and the blades 25 are shaped so as to be alined generally with the teeth, although somewhat wider than the latter. The outer surface 25ª of each blade is somewhat slanted or inclined with respect to the axis of the cutter and the outer surface or edge 22ª of each tooth is similarly inclined or slanted so as to give the necessary clearance along the apices of the teeth.

The blades 25 are secured against the tooth faces 24 by bolts 27 and 28, and these bolts are also somewhat slanted or inclined with respect to the axis of the cutter so that those portions of the bolts which are adjacent the blades 25 are farther from the cutter axis than are the opposite ends of said bolts. The bolts 27 and 28, therefore, serve to draw the blades 25 against the surfaces 24 in a somewhat inclined direction with respect to the axis of the cutter and with respect to the shoulders 23, and this has given very satisfactory results in actual practice.

The bolt 27 has an enlargement in the form of a cylindrical head 29 disposed in a counterbore 30 at the front face of the blade 25. At its rear end the bolt 27 is provided with a nut 31 by means of which the blade can be drawn and held against its seat. The nut 31 is located in a recess 32 at the rear of the tooth. The bolt 28 is located nearer the periphery of the cutter than is bolt 27, and in this particular instance has a threaded forward end portion 33 engaging a threaded socket 34 in blade 25, which socket extends into but not through the blade. At its rear end the bolt 28 has a cylindrical head 35 provided at its rear face with a hexagonal socket 36, best shown in Fig. 5, for the insertion of a suitable tool by means of which the bolt is tightly screwed into the blade 25. The head 35 is located in the recess 32 somewhat above the nut 31.

On the rear face of the blade 25 between the margins thereof and extending downwardly from the top to the bore for the bolt 27 is a small tenon 37 disposed on opposite sides of the bore for the bolt 28 and adapted to engage the correspondingly shaped groove 38 on the tooth face 34, as shown more particularly in Figs. 1, 2 and 3. The interengagement of the tenon and groove aids in the securing of the blade to the front face of the tooth in such a manner that the blade cannot shift in any direction relatively to the tooth when held in position by the securing bolts. The blade or bit is urged radially in an inward direction by means such as a bolt 39 passing through an overhanging ledge 40 on which the shoulders 23 are formed, there preferably being one bolt 39 for each of the blades. Each bolt has a head 41 located in a counterbore 42 in the ledge, and the threaded shank of each bolt engages a threaded bore 43 located in the lower or inner part of the blade. In the form shown, the threaded bore 43 in the blade communicates with the counterbore 30, but this is not essential, and it will be observed that after the blade has been placed in position upon its supporting shoulder 23, either the large bolt 27 or the relatively small radial bolt 39 may first be placed in position.

It will be observed that while the front face of blade 25 is generall perpendicular to the axis of the cutter, the faces 24 of the teeth against which the blades 25 are clamped are neither parallel to the front face of the blade nor at right angles to the longitudinal axis of the corresponding tooth. In the preferred form the front face of each tooth is located at about 80° to the longitudinal axis of the tooth. This feature is shown particularly in Fig. 4, and it has been found very helpful in preventing relative dislocation between the blade and its supporting tooth. I do not limit myself to the 80° angle above mentioned, but in all cases the angle of the rear face of the cutter blade to the longitudinal axis of the tooth should be substantially less than a right angle. The drawing of the blade generally lengthwise of the tooth but at the same time somewhat inwardly, as previously described, has also been found to be a feature of considerable advantage in causing the blade to be firmly held in the angle between the front face of the tooth and the outwardly directed face of the shoulder 23.

The cutter shown in Figs. 6 to 12, inclusive, is another cutter intended for use in cutting helical gears, differing somewhat in detail from the one first described. Here again, however, the inner and outer bolts 44 and 45 for securing the cutter bit or blade 46 in place are located at a slight angle to the longitudinal axis of the cutter and adapted to draw the cutting blade into its seat in substantially the same manner hereinbefore described. In this case, however, it will be observed that the bit considerably overhangs the supporting ledge 47 on the cutter body. In form the bolt 44 is similar to the bolt 27 hereinbefore described, but in this case the outer bolt, 45, is similar to the inner bolt in that it has a cylindrical head located in a counterbore in the bit and inasmuch as it is provided at the rear end with a nut engaging threads on the bolt shank so that when the nut is screwed up on the shank the bit will be drawn rearwardly. In this form of the invention the bits are of somewhat different size and shape from those shown in Fig. 1 and are seated upon flat seats 48. Between the blades or bits are located small wedges 49 which urge the bits radially inward against the seats 48. These wedges engage side surfaces 50, 51 on the bits, and it will be observed that in plan the wedges are tapered, being somewhat wider at the rear than at the front, as shown in Fig. 7. These wedges are engaged by screws 52 passing through the ledge 47 and having threaded shanks engaging threaded holes in the wedges. The heads 53 of the screws 52 are nicked so that they can be turned by a screw driver for drawing the wedges radially inward and thereby engaging and drawing inward the side portions of the bits or blades on opposite sides of the wedge.

In Figs. 13 and 14 I have shown a cutter for cutting gears having spur teeth, and in this form the cutter blades 54 are each secured in place by an inner bolt 55 and an outer bolt 56 generally similar to the bolts 44 and 45 previously described. In this case, however, the inner bolt 55 instead of being at an inclination to the axis of the cutter is parallel thereto so that the two bolts 55 and 56 are located at a slight angle to each other. In this form both bolts 55 and 56 have heads engaging bores which extend all the way through the blade, but this is not essential in all cases. In this form the shoulders seating the blades at their inner edges all form in conjunction a single shoulder, which single shoulder is of annular formation, the bottom of each blade being curved to conform thereto. The curved annular shoulder is shown at 57. This shoulder is formed on a ledge projecting axially from the cutter body as in the forms previously described. In constructing a cutter for straight-tooth gears I usually find it unnecessary to employ means for drawing the cutter blade radially inward against the ledge, but in some cases it may be desirable to employ devices of the general nature hereinbefore described for achieving this purpose.

Various changes can be made in the details of the gear cutter structure without departing from the scope of my invention as defined in the claims. While I have illustrated and described several embodiments of my invention it will be understood that I have not attempted to illustrate or describe all of the possible modifications.

What I claim is:

1. A composite gear cutter of the pinion type comprising a body having teeth upon its periphery and underlying fixed shoulders having outwardly directed faces located adjacent the end faces of said teeth, said outwardly directed faces being substantially parallel to the cutter axis, cutting blades having their inner edges seated upon said shoulders and extending alongside the end faces of said teeth, and means for securing each cutting blade in position comprising a bolt extending through the corresponding tooth and engaging the cutting blade to draw it against the end face of the tooth, said bolt being located at a slight angle to the longitudinal axis of the cutter and having its end remote from the cutting blade disposed nearer to the cutter axis than is the opposite end of said bolt.

2. A composite gear cutter of the pinion type comprising a body having teeth upon its periphery and an underlying ledge projecting axially of the cutter at one side thereof and presenting outwardly directed faces substantially parallel to the cutter axis for engaging the inner edges of cutting blades, cutting blades having their inner edges seated upon said faces and having their rear faces abutting the forward faces of said teeth, and means for securing each blade in position comprising a plurality of bolts engaging the blade and the corresponding tooth, at least one of said bolts being disposed at a slight angle to the longitudinal axis of the cutter and having its end portion which engages the blade located farther away from the longitudinal cutter axis than is the rear end portion of said bolt.

3. A composite gear cutter of the pinion type comprising a body having teeth upon its periphery and an underlying ledge projecting axially of the cutter at one side thereof and presenting outwardly directed faces for engaging the inner edges of cutting blades, cutting blades having their inner edges seated upon said faces and having their rear faces abutting the forward faces of said teeth, and means for securing each blade in position comprising a plurality of bolts engaging the blade and the corresponding tooth, at least one of said bolts being disposed at a slight angle to the longitudinal axis of the cutter and having its end portion which engages the blade located farther away from the longitudinal cutter axis than is the rear end portion of said bolt, said bolt having a cylindrical head at its front end engaging a bore extending completely through the blade, and said bolt being provided at its rear end with a nut for drawing the blade rearwardly into its seat.

4. A composite gear cutter of the pinion type comprising a body having teeth upon its periphery and an underlying ledge projecting axially of the cutter at one side thereof and having outwardly directed surfaces adapted to engage the inner edges of cutting blades, cutting blades having their inner edges seated upon said surfaces and having rear faces adapted to abut the forward faces of the teeth, and a plurality of bolts for securing each of said blades detachably in position, one of said bolts being an inner bolt and the other being an outer bolt, both of said bolts being inclined slightly relatively to the axis of the cutter and each having its rear end portion closer to the cutter axis than is the front end portion of said bolt.

5. A composite gear cutter of the pinion type comprising a body having teeth upon its periphery, the end faces of said teeth at one side of the cutter being so located that there is presented an outwardly directed fixed shoulder at the base of each tooth, cutting blades lying against the end faces of said teeth and seated at their inner edges upon the outer faces of said shoulders, each blade having at a point spaced outwardly from the shoulder a hole extending through the blade from front to rear and the corresponding tooth having a through front-to-rear hole registering with that of the blade, a fastening bolt for the blade passing through the registering holes in the blade and tooth, and a second bolt spaced outwardly from the first and likewise passing through a front-to-rear hole in the tooth and engaging the blade at its outer part for securing it in position, said second bolt being inclined with respect to the cutter axis and having its blade-engaging end farther from the cutter axis than is the rear end of said bolt.

6. A composite gear cutter of the pinion type comprising a body having teeth upon its periphery, the end faces of said teeth at one side of the cutter being so located that there is presented an outwardly directed fixed shoulder at the base of each tooth, cutting blades lying against the end faces of said teeth and seated at their inner edges upon the outer faces of said shoulders, each blade having at a point spaced outwardly from the shoulder a hole extending through the blade from front to rear and the corresponding tooth having a through front-to-rear hole registering with that of the blade, the hole in the blade being counterbored at the front face of the blade, a fastening bolt for the blade passing through the registering holes in the blade and tooth and having a head within the counterbore at the front face of the blade and a nut at the rear face of the tooth, and a second bolt spaced outwardly from the first and likewise passing through a front-to-rear hole in the tooth, said second bolt having a threaded forward end engaging a threaded socket in the rear face of the blade and having at its rear end a head by means of which said bolt may be rotated for drawing the blade rearwardly into its seat.

7. A composite gear cutter of the pinion type comprising a body having teeth upon its periphery, the end faces of said teeth at one side of the cutter being so located that there is presented an outwardly directed fixed shoulder at the base of each tooth, cutting blades lying against the end faces of said teeth and seated at their inner edges upon the outer faces of said shoulders, each blade having at a point spaced outwardly from the shoulder a hole extending through the blade from front to rear and the corresponding tooth having a through front-to-rear hole registering with that of the blade, the hole in the blade being counterbored at the front face of the blade, a fastening bolt for the blade passing through the registering holes in the blade and tooth and having a head within the counterbore at the front face of the blade and a nut at the rear face of the tooth, and a second bolt spaced outwardly from the first and likewise passing through a front-to-rear hole in the tooth, said second bolt having a threaded forward end engaging a threaded socket in the rear face of the blade and having at its rear end a head by means of which said bolt may be rotated for drawing the blade rearwardly into its seat, both of said bolts having their rear ends nearer to the longitudinal axis of the cutter than are their front blade-engaging ends.

8. A composite gear cutter of the pinion type comprising a body having teeth upon its periphery, and an axially projecting ledge at one side presenting surfaces to engage the inner edges of cutting blades, cutting blades having their inner edges seated upon said surfaces and extending alongside the end faces of said teeth, a bolt extending substantially lengthwise of the tooth for drawing each cutting blade rearwardly into its seat, and a bolt extending radially through the ledge and engaging a threaded socket in each blade for urging the blade radially inward.

9. In a gear cutter of the pinion type, a body having teeth upon its periphery, the end face of each of said teeth being spaced from the side of the body to form an outwardly directed fixed shoulder on the body at the base of the tooth, an axially projecting ledge on the body on which said shoulders are disposed, cutting blades in the form of gear teeth seated directly on said shoulders, means for drawing said blades against the end faces of the teeth, and means comprising radially directed bolts engaging the cutting blades for urging them radially inward against said shoulders, said blades having threaded sockets engaged by the threaded shanks of said bolts, and said bolts having heads received in recesses in the inner part of said ledge.

J. F. LEAHY.